United States Patent [19]

Bruggers

[11] Patent Number: 4,629,315
[45] Date of Patent: Dec. 16, 1986

[54] DEVICE FOR POSITIONING ORIGINALS IN SHEET FORM

[75] Inventor: Jan W. Bruggers, Venlo, Netherlands

[73] Assignee: Oce-Nederland B.V., Venlo, Netherlands

[21] Appl. No.: 783,947

[22] Filed: Oct. 3, 1985

[30] Foreign Application Priority Data

Oct. 10, 1984 [NL] Netherlands .................. 8403080

[51] Int. Cl.⁴ .................. G03B 27/62; B65H 9/04
[52] U.S. Cl. ................................. 355/75; 271/245
[58] Field of Search ............. 355/3 SH, 75; 271/245

[56] References Cited

U.S. PATENT DOCUMENTS

| | | | |
|---|---|---|---|
| 3,804,514 | 4/1974 | Jasinski | 355/75 |
| 3,910,570 | 10/1975 | Bleau | 271/245 |
| 4,183,519 | 1/1980 | Harris | 271/245 |
| 4,243,316 | 1/1961 | Gustafson | 355/75 |
| 4,322,160 | 3/1982 | Kobus | 271/245 X |
| 4,334,674 | 6/1982 | Ishii | 271/245 |

Primary Examiner—Richard A. Wintercorn
Attorney, Agent, or Firm—Reed Smith Shaw & McClay

[57] ABSTRACT

A device for positioning an original in sheet form on an exposure table comprising a ruler and a means for moving the ruler between a position in which an edge of the ruler extends upwardly from the exposure table for positioning and retaining a sheet original arriving along the exposure table and a position in which the original is released so that it may be displaced in the direction of and past the ruler. The exposure table has a recessed part such that when the ruler occupies the retaining position the part of the ruler bearing the retaining edge rests partly in the recessed part such that it lies against the upright wall of the recessed part and partly projects above the surface of the exposure table.

4 Claims, 2 Drawing Figures

DEVICE FOR POSITIONING ORIGINALS IN SHEET FORM

BACKGROUND OF THE INVENTION

1. Field of the Invention

The present invention relates to a device for positioning an original in sheet form on the exposure table of a copying machine.

2. Description of the Prior Art

Many devices are known to those skilled in the art for positioning an original on the exposure table of a copying machine. Several use a pivotable ruler or registration member which is used to position the original. For example, *IBM Technical Disclosure Bulletin*, Vol. 17, No. 4 (September 1974) at p. 1131, and *IBM Technical Disclosure Bulletin*, Vol. 21, No. 6 (November 1978) at pp. 2222–23, disclose positioning devices in which a ruler of flexible material is disposed at an angle of about 45° to an end edge of the exposure table of a copying machine. The ruler is slidable in its own plane from downwardly retracted position up to an upright position in which its top part projects above the table surface. In the retracted position, the original can pass; whereas, in the upright position, the original is retained by the top projection. Similarly, *Research Disclosure*, No. 19805 (October 1980) at pp. 407–08, shows a positioning device having a moveable registration membr which is retractable from the edge of the exposure table.

All of these devices suffer from the same disadvantage that documents, particularly if they are flexible, may slide between the exposure table and the ruler or registration member. If this happens, the document may be clamped in a bad position for copying or worse, damaged. This problem particularly occurs with thinner documents but can occur even with thicker ones. For example, the device of *Research Disclosure*, No. 19805 (October 1980) at pp. 407–08, has a broad gap between the registration member and the exposure table in which originals may be clamped and damaged.

Other devices have a ruler or registration member which is pivotable about an axis in their longitudinal direction. The ruler pivots, bringing it onto the exposure table, or pivots taking it away therefrom. As with the other prior art devices, there is the risk that the front edge of thin sheets may penetrate between the retaining edge of the ruler and the exposure table at one or more places. If this happens, the original will be in an undesirable position for copying and may be damaged.

One proposed solution, as described in U.S. Pat. No. 4,183,519, is to press a number of discrete fingers resiliently downwards onto the exposure table. These fingers operate as a ruler. There must be a fairly considerable spring force applied to the fingers to prevent the original from sliding underneath. In this case, however, the sharp bottom edge of the fingers scrapes over the exposure table and results in undesired wear, particularly of the bottom edge.

*Research Disclosure*, No. 18649 (October 1979) at pp. 587–90 (corresponding to U.S. Pat. No. 4,243,316), also discloses a device wherein the ruler pivots. Although the exposure table has a recessed part, the ruler in actuality bears against the transitional edge from the flat exposure table to the upright wall of the recess in order to form a clamping wedge for the documents. The recesses part accommodates with considerable play a reinforcing part of the ruler. The recessed part also serves to receive a moveable guide surface which can pivot in order to be brought into the path of returning documents when copying of the second side is required. The accuracy of the positioning of this device is generally open to criticism while, here again, the front edge of thin sheets may slide too far and end up between the transitional edge and the ruler.

U.S. Pat. No. 4,334,674 discloses a registration device having a magnetic registration member which is located adjacent to the forward edge of a platen and an electromagnet in a cover which is disposed parallel to the magnetic registration member. The end surface of the platen, against which the registration member is disposed, may be vertical or sloped. If the end surface is vertical, light may not reach the leading edge of the original preventing proper exposure. If the end surface is sloped, there exists the disadvantage mentioned above that the leading edge of an original, particularly a thin one, will be fed and clamped in the slit between the registration member and the sloped edge of the platen.

SUMMARY OF THE INVENTION

Generally, the present invention remedies the misalignment, clamping and damage mentioned above by providing a device for positioning an original comprising a moveable ruler extending along an edge of the exposure table and a means for moving the ruler between a position in which an edge of the ruler extends upwardly from the exposure table in order to align and retain a sheet original arriving along the exposure table by its front edge and a position in which the sheet original is released so that it can be displaced in the direction of and past the ruler. The exposure table has a recessed part near the ruler wherein the part of the ruler bearing the relevant retaining edge when in the position for retaining an original partly lies in the recessed part and so fits therein that the ruler lies against the upright wall of the recessed part directly adjoining the table surface and forms an edge which merges directly into the retaining edge projecting above the table surface.

Preferably, the retaining edge and the ruler edge fitting in the recessed part are situated in one plane substantially perpendicular to the surface of the exposure table. Additionally, the positioning device is preferably so constructed that the means for bringing the ruler into the retaining position also presses the ruler edge located in the recessed part of the exposure table against the wall of the recessed part that directly adjoins the table surface.

DESCRIPTION OF THE PREFERRED EMBODIMENTS

Figure 1:
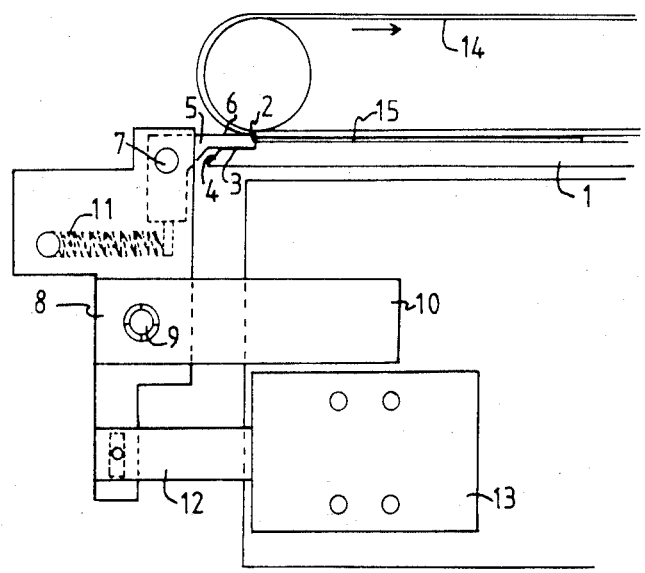
FIG. 1 is a schematic front view of the positioning device according to the invention with the ruler in the position for aligning and retaining a sheet.

As shown in FIG. 1, a copying machine exposure table 1 which may, for example, consist of a glass plate is provided near one end with a recessed part 3, an upright wall 2 and a part 4 which slopes obliquely downwards from recessed part 3 to the end of the table. A ruler 5 presses on recessed part 3 and against upright wall 2. Top surface 6 of ruler 5 projects above the surface of exposure table 1. Ruler 5 extends over the entire width of exposure table 1 forming an upright edge along table 1 against which a sheet original fed over exposure table 1 is positioned.

Ruler 5 is rotatably fixed to a pin 7 which projects from a profile 8. Profile 8 is rotatable about a spindle 9 carried by a plate 10 secured to the frame of the copying machine. A spring 11 stretched between ruler 5 and profile 8 presses ruler 5 into recessed part 3 of exposure table 1. At the bottom, profile 8 is connected to an arm 12 of solenoid 13.

In the position shown in FIG. 1, arm 12 in response to a spring present in solenoid 13 presses against profile 8 so that the upright edge of ruler 5 is pressed against upright wall 2 of exposure table 1. A conveyor belt 14 runs over exposure table 1 in the direction indicated by the arrow. Conveyor belt 14 feeds a sheet original 15 over exposure table 1 and positions it against the upright edge of ruler 5, whereupon it is exposed to light one or more times.

Figure 2:
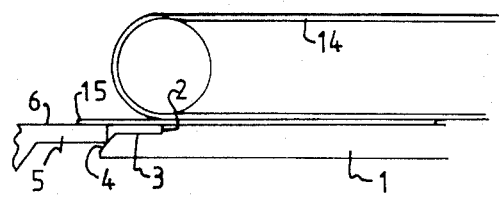
FIG. 2 represents a portion of the device shown in FIG. 1 with the ruler in the position for allowing a sheet to pass.

After exposure, solenoid 13 is energized so that arm 12 moves to the right causing profile 8 to rotate in the counterclockwise direction about spindle 9. This moves ruler 5 to the left until it occupies the position shown in FIG. 2. Sheet original 15 lying on exposure table 1 may be taken away by conveyor belt 14 over the top surface 6 of ruler 5.

After sheet original 15 has been taken away, solenoid 13 is de-energized moving arm 12 to the left by spring pressure and causing ruler 15 to be returned to its initial position, shown in FIG. 1.

All kinds of modifications can be made to the above-described construction. For example, the above-described mechanism for moving the ruler can be replaced by other known mechanisms, such as the one described in U.S. Pat. No. 4,183,519.

While presently preferred embodiments of the present invention have been described in particularity with reference to the drawings, the invention may be otherwise embodied within the scope of the appended claims.

What is claimed is:

1. A device for positioning an original in sheet form on an exposure table of a copying machine comprising a moveable ruler extending along an edge of the exposure table and a means for moving the ruler between a position in which an edge of the ruler extends upwardly from the exposure table to position and retain a sheet original arriving along the exposure table by its front edge and a position in which the sheet original is released so that it can be displaced in the direction of and past the ruler, wherein the exposure table has a recessed part near the ruler such that the part of the ruler bearing the relevant retaining edge when in the position for retaining an original partly lies in the recessed part and so fits therein that the ruler lies against the upright wall of the recessed part directly adjoining the table surface and forms an edge which merges directly into the retaining edge projecting above the table surface.

2. A device as described in claim 1, wherein the formed edge and the retaining edge which merge directly into one another lie in one plane which when in the position for retaining a sheet original extends substantially perpendicular to the plane of the exposure table.

3. A device as described in claim 1, wherein the means for bringing the ruler into the position for retaining a sheet original presses the ruler into the recessed part of the exposure table and against the wall of the recessed part that directly adjoins the table surface.

4. A device as described in claim 2, wherein the means for bringing the ruler into the position for retaining a sheet original presses the ruler into the recessed part of the exposure table and against the wall of the recessed part that directly adjoins the table surface.

* * * * *